United States Patent
Yamada et al.

(10) Patent No.: US 7,670,708 B2
(45) Date of Patent: Mar. 2, 2010

(54) SOLID POLYELECTROLYTE FUEL CELL

(75) Inventors: Akihiko Yamada, Hiroshima (JP);
Shigeru Tsurumaki, Hiroshima (JP);
Satoru Watanabe, Yokohama (JP);
Takuya Moriga, Hiroshima (JP); Hideki Ito, Hiroshima (JP); Ichiro Toyoda, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1051 days.

(21) Appl. No.: 11/355,185

(22) Filed: Feb. 16, 2006

(65) Prior Publication Data

US 2006/0275650 A1    Dec. 7, 2006

(30) Foreign Application Priority Data

Jun. 2, 2005 (JP) ............... 2005-162469
Oct. 17, 2005 (JP) ............... 2005-301234

(51) Int. Cl.
*H01M 2/00*    (2006.01)

(52) U.S. Cl. .................................. 429/34

(58) Field of Classification Search ............ 429/34
See application file for complete search history.

(56) References Cited

U.S. PATENT DOCUMENTS

| | | | |
|---|---|---|---|
| 5,464,700 | A | 11/1995 | Steck et al. |
| 6,149,810 | A | 11/2000 | Gonzalez-Martin et al. |
| 6,335,112 | B1 | 1/2002 | Asukabe et al. |
| 2003/0008196 | A1 | 1/2003 | Wessel et al. |
| 2003/0091885 | A1 | 5/2003 | Kobayashi et al. |
| 2003/0134180 | A1 | 7/2003 | Hori et al. |

(Continued)

FOREIGN PATENT DOCUMENTS

EP    0 589 535 A1    3/1994

(Continued)

OTHER PUBLICATIONS

Search Report dated Dec. 5, 2007 issued in corresponding European Application No. 06003385.9.

(Continued)

*Primary Examiner*—Patrick Ryan
*Assistant Examiner*—Thomas H. Parsons
(74) *Attorney, Agent, or Firm*—Westerman, Hattori, Daniels & Adrian, LLP

(57) ABSTRACT

Provided is a solid polyelectrolyte fuel cell capable of suppressing a gas leak between a fuel electrode film side and an oxide electrode film side by suppressing deterioration of a solid polyelectrolyte film on its peripheral side. A solid polyelectrolyte fuel cell includes: a cell in which electrode films are provided on one side and the other side of a solid polyelectrolyte film, respectively; a first gas diffusion layer provided so as to cover the electrode film on one side of the cell; a second gas diffusion layer provided so as to cover the electrode film on the other side of the cell; and separators provided on the one side and the other side of the cell, respectively, with the gas diffusion layers interposed therebetween. The solid polyelectrolyte fuel cell includes: first insulating layers which are provided between the solid polyelectrolyte film of the cell and the gas diffusion layers and have electrical insulating properties; and second insulating layers which are provided on peripheral edges of the gas diffusion layers and have electrical insulating properties.

2 Claims, 10 Drawing Sheets

U.S. PATENT DOCUMENTS

| | | |
|---|---|---|
| 2003/0166824 A1 | 9/2003 | Sasaki et al. |
| 2003/0198860 A1 | 10/2003 | Yasumoto et al. |
| 2004/0043285 A1 | 3/2004 | Nagoshi |
| 2005/0100776 A1 | 5/2005 | Brunk et al. |

FOREIGN PATENT DOCUMENTS

| | | |
|---|---|---|
| EP | 1 298 751 A2 | 4/2003 |
| EP | 1 336 999 A1 | 8/2003 |
| EP | 1 429 410 A1 | 6/2004 |
| EP | 1 643 573 A1 | 4/2006 |
| EP | 1 662 595 A1 | 5/2006 |
| JP | 2001-118591 A | 4/2001 |
| JP | 3271410 | 1/2002 |
| JP | 3345240 | 8/2002 |
| JP | 2003-123777 | 4/2003 |
| JP | 2003-0123777 | 4/2003 |
| WO | WO 03/063280 A2 | 7/2003 |
| WO | WO 2004/114444 A1 | 12/2004 |
| WO | WO 2005/020357 A1 | 3/2005 |

OTHER PUBLICATIONS

XP-002129713 (Solid Polymer Electrolyte Fuel Cells (SPEFC)), Energy, The Scientific and Technical Information Branch, Washington, DC, vol. 11, 1986, 137-152.

Canadian Office Action dated Apr. 3, 2009, issued in corresponding Canadian Patent Application No. 2,536,731.

Partial European Search Report dated Sep. 14, 2006, issued in corresponding European Application No. 06003385.

U.S. Appl. No. 11/042,311, Mitsubishi Heavy Industries, Ltd.

U.S. Appl. No. 11/042,338, Mitsubishi Heavy Industries, Ltd.

SOLID POLYELECTROLYTE FUEL CELL

BACKGROUND OF THE INVENTION

1. Field of the Invention

The present invention relates to a solid polyelectrolyte fuel cell.

2. Description of the Related Art

FIG. 10 shows a schematic diagram of a main part of a conventional solid polyelectrolyte fuel cell.

As shown in FIG. 10, on one side of a solid polyelectrolyte film 111 having proton ($H^+$) conductivity, a fuel electrode film 112 is attached, which contains catalytic metal such as Pt—Ru and has conductivity and gas permeability. On the other side of the solid polyelectrolyte film 111, an oxide electrode film 113 is attached, which contains catalytic metal such as Pt and has conductivity and gas permeability.

On a side of the fuel electrode film 112 that is an electrode film on one side of a solid polyelectrolyte film electrode conjugate (cell) including the solid polyelectrolyte film 111, the fuel electrode film 112, the oxide electrode film 113 and the like, a first gas diffusion layer 114 having conductivity and gas diffusivity is attached so as to surround and cover the fuel electrode film 112. In other words, the first gas diffusion layer 114, which is larger than the fuel electrode film 112, is attached so as to come into direct contact with the solid polyelectrolyte film 111 as well as the fuel electrode film 112. On a side of the oxide electrode film 113 that is an electrode film on the other side of the cell, a second gas diffusion layer 115 having conductivity and gas diffusivity is attached so as to surround and cover the oxide electrode film 113. In other words, the second gas diffusion layer 115, which is larger than the oxide electrode film 113, is attached so as to come into direct contact with the solid polyelectrolyte film 111 as well as the oxide electrode film 113.

On the one side and the other side of the cell, on which the gas diffusion layers 114 and 115 are attached, respectively, separators 116 having conductivity are provided, respectively. Specifically, in the separator 116 provided on the one side of the cell, a fuel gas passage for hydrogen gas and the like is formed. Moreover, in the separator 116 provided on the other side of the cell, an oxide gas passage for air, oxygen and the like is formed.

A periphery of the solid polyelectrolyte film 111, which is exposed from peripheries of the electrode films 112 and 113 and the gas diffusion layers 114 and 115, is held by the separators 116 with sealants 117 interposed therebetween.

Note that, in FIG. 10, the gas diffusion layers 114 and 115 are closely attached to end faces of the electrode films 112 and 113 without having spaces between the end faces thereof and the layers. However, in reality, the gas diffusion layers 114 and 115 may be attached so as to come into direct contact with the solid polyelectrolyte film 111 while having spaces between the end faces of the electrode films 112 and 113 and the layers.

In the conventional solid polyelectrolyte fuel cell 110 as described above, when fuel gas is supplied to the fuel gas passage of the separator 116 and oxide gas is supplied to the oxide gas passage of the separator 116, the fuel gas is supplied to the fuel electrode film 112 while being diffused in the first gas diffusion layer 114 and the oxide gas is supplied to the oxide electrode film 113 while being diffused in the second gas diffusion layer 115. Accordingly, the fuel gas and the oxide gas electrochemically react with each other. Thus, protons ($H^+$) generated from hydrogen gas on the fuel electrode film 112 side move toward the oxide electrode film 113 within the solid polyelectrolyte film 111. At the same time, electrons ($e^-$) generated from the hydrogen gas on the fuel electrode film 112 side flow toward the oxide electrode film 113 through the separator 116 and the second gas diffusion layer 115 from the first gas diffusion layer 114 and the separator 116 via an external electric circuit. Thus, electricity can be generated while generating water by allowing oxygen to react with the protons and the electrons on the oxide electrode film 113 side.

<Related Arts>
A. Japanese Patent No. 3271410
B. Japanese Patent No. 3345240
C. Japanese Patent Laid-Open Publication No. 2003-123777

SUMMARY OF THE INVENTION

Meanwhile, in the conventional solid polyelectrolyte fuel cell as described above, when the fuel gas and the oxide gas are supplied into the cell, in the reactions described above or the like, a side reaction product such as hydrogen peroxide ($H_2O_2$) is generated. Thus, when a radical such as a hydroxy radical (.OH) is generated from the hydrogen peroxide, the radical may deteriorate the solid polyelectrolyte film 111 and cause a gas leak between the fuel electrode film 112 side and the oxide electrode film 113 side.

The inventors of the present invention have studied such deterioration of the solid polyelectrolyte film 111 due to the radical and found out that the deterioration mostly occurs in the periphery of the solid polyelectrolyte film 111.

Accordingly, it is an object of the present invention to study on a deterioration mechanism of a solid polyelectrolyte film and to provide a solid polyelectrolyte fuel cell capable of suppressing a gas. leak between a fuel electrode film side and an oxide electrode film side by taking measures against deterioration of the solid polyelectrolyte film based on the study and by suppressing deterioration in a periphery of the solid polyelectrolyte film.

A first aspect of the present invention, in order to solve the problems described above, is a solid polyelectrolyte fuel cell including: a solid polyelectrolyte film electrode conjugate in which electrode films are provided on one side and the other side of a solid polyelectrolyte film, respectively; a first gas diffusion layer provided so as to cover the electrode film on one side of the solid polyelectrolyte film electrode conjugate; a second gas diffusion layer provided so as to cover the electrode film on the other side of the solid polyelectrolyte film electrode conjugate; and separators provided on the one side and the other side of the solid polyelectrolyte film electrode conjugate, respectively, with the gas diffusion layers interposed therebetween. The solid polyelectrolyte fuel cell includes a first deterioration inhibitor which is provided between the solid polyelectrolyte film of the solid polyelectrolyte film electrode conjugate and at least one of the first and second gas diffusion layers so as to prevent direct contact between the solid polyelectrolyte film and at least one of the first and second gas diffusion layers, and inhibits generation of radicals between the solid polyelectrolyte film and at least one of the first and second gas diffusion layers.

A second aspect of the present invention is a solid polyelectrolyte fuel cell including: a solid polyelectrolyte film electrode conjugate in which electrode films are provided on one side and the other side of a solid polyelectrolyte film, respectively; a first gas diffusion layer provided so as to cover the electrode film on one side of the solid polyelectrolyte film electrode conjugate; a second gas diffusion layer provided so as to cover the electrode film on the other side of the solid polyelectrolyte film electrode conjugate; and separators provided on the one side and the other side of the solid polyelectrolyte film electrode conjugate, respectively, with the gas diffusion layers interposed therebetween. In the solid polyelectrolyte fuel cell, at least one of the first and second gas diffusion layers is provided only on the electrode film without coming into contact with the solid polyelectrolyte film of the solid polyelectrolyte film electrode conjugate.

A third aspect of the present invention is a solid polyelectrolyte fuel cell including: a solid polyelectrolyte film electrode conjugate in which electrode films are provided on one side and the other side of a solid polyelectrolyte film, respectively; a first gas diffusion layer provided so as to cover the electrode film on one side of the solid polyelectrolyte film electrode conjugate; a second gas diffusion layer provided so as to cover the electrode film on the other side of the solid polyelectrolyte film electrode conjugate; and separators provided on the one side and the other side of the solid polyelectrolyte film electrode conjugate, respectively, with the gas diffusion layers interposed therebetween. In the solid polyelectrolyte fuel cell, a peripheral side of the solid polyelectrolyte film exposed from the electrode films in the solid polyelectrolyte film electrode conjugate contains a deterioration inhibitor for suppressing generation of radicals by decomposing hydrogen peroxide into water and oxygen.

A fourth aspect of the present invention is the solid polyelectrolyte fuel cell according to one of the first and second aspects of the present invention, including a second deterioration inhibitor which is provided in peripheral ends of the solid polyelectrolyte film of the solid polyelectrolyte film electrode conjugate and at least one of the first and second gas diffusion layers so as to prevent direct contact between the solid polyelectrolyte film and at least one of the first and second gas diffusion layers, and inhibits generation of radicals between the solid polyelectrolyte film and at least one of the first and second gas diffusion layers.

A fifth aspect of the present invention is the solid polyelectrolyte fuel cell according to any of the first to third aspects of the present invention, in which spaces are provided between the solid polyelectrolyte film of the solid polyelectrolyte film electrode conjugate and the separators.

A sixth aspect of the present invention is the solid polyelectrolyte fuel cell according to the fifth aspect of the present invention, including a third deterioration inhibitor which is provided in each of the spaces so as to prevent direct contact between the solid polyelectrolyte film of the solid polyelectrolyte film electrode conjugate and the separators, and inhibits generation of radicals between the solid polyelectrolyte film and the separators.

A seventh aspect of the present invention is the solid polyelectrolyte fuel cell according to any of the first, fourth and sixth aspects of the present invention, in which the deterioration inhibitor has electrical insulating properties.

An eighth aspect of the present invention is the solid polyelectrolyte fuel cell according to any of the first, fourth and sixth aspects of the present invention, in which the deterioration inhibitor decomposes hydrogen peroxide into water and oxygen.

A ninth aspect of the present invention is the solid polyelectrolyte fuel cell according to any of the first, fourth and sixth aspects of the present invention, in which the deterioration inhibitor is a periphery of the electrode film, which is extended more than a periphery of at least one of the first and second gas diffusion layers.

A tenth aspect of the present invention is the solid polyelectrolyte fuel cell according to the sixth aspect of the present invention, in which the third deterioration inhibitor is a sealant which seals between peripheries of the separators adjacent to each other.

As described above, in the solid polyelectrolyte fuel cell, when fuel gas and oxide gas are supplied into a cell, in the reactions described above or the like, a side reaction product such as hydrogen peroxide ($H_2O_2$) is generated. When a radical such as a hydroxy radical (.OH) is generated from the side reaction product such as the hydrogen peroxide, there has heretofore been a risk that the radical deteriorates a solid polyelectrolyte film and causes a gas leak between a fuel electrode film side and an oxide electrode film side.

Thus, the inventors of the present invention have conducted a test for deterioration of the solid polyelectrolyte film due to the radicals as described above. As a result, it has been found out that the deterioration occurs more often in a periphery of the solid polyelectrolyte film (a spot where the solid polyelectrolyte film comes into contact with the gas diffusion layers) than in a center of the solid polyelectrolyte film (a spot where the solid polyelectrolyte film comes into contact with the electrode films).

As a result of further research and studies conducted by the inventors of the present invention on the cause for the above, it has been assumed that the deterioration of the solid polyelectrolyte film described above occurs based on the following phenomena.

Specifically, the side reaction product such as hydrogen peroxide ($H_2O_2$) generated when the fuel gas and the oxide gas are supplied into the cell, in the reactions described above or the like is decomposed into water and oxygen by catalytic metal in the oxide electrode film between the solid polyelectrolyte film and the oxide electrode film before generation of radicals such as a hydroxy radical (.OH). Thus, deterioration of the solid polyelectrolyte film is suppressed (see the following formula (1)). However, between the solid polyelectrolyte film and the gas diffusion layers, the side reaction product such as hydrogen peroxide ($H_2O_2$) immediately reacts with protons ($H^+$) and electrons ($e^-$) to generate radicals such as the hydroxy radical (.OH). Thus, the solid polyelectrolyte film is deteriorated (see the following formula (2)).

$$H_2O_2 \rightarrow H_2O + \tfrac{1}{2}O_2 \tag{1}$$

$$H_2O_2 + H^+ + e^- \rightarrow .OH + H_2O \tag{2}$$

Accordingly, the solid polyelectrolyte fuel cell according to the present invention achieves the following by having the configuration described above. Specifically, in the periphery of the solid polyelectrolyte film, supply of electrons from the gas diffusion layers is prevented on interfaces between the solid polyelectrolyte film and the gas diffusion layers. Thus, the reaction of the above formula (2) on the gas diffusion layers is suppressed. Moreover, between the solid polyelectrolyte film and the gas diffusion layers, generation of radicals such as a hydroxy radical (.OH) from the side reaction product such as hydrogen peroxide ($H_2O_2$) is prevented. Furthermore, before generation of the radicals such as the hydroxy radical (.OH) from the side reaction product such as hydrogen peroxide ($H_2O_2$) generated between the solid polyelectrolyte film and the gas diffusion layers, the side reaction product such as hydrogen peroxide ($H_2O_2$) is decomposed into water and oxygen. Thus, the reaction of the formula (1) between the solid polyelectrolyte film and the gas diffusion layers is accelerated. In other words, the reaction of the formula (2) is suppressed to prevent generation of the radicals such as the hydroxy radical (.OH) from the side reaction product such as hydrogen peroxide ($H_2O_2$) between the solid polyelectrolyte film and the gas diffusion layers.

Therefore, according to the solid polyelectrolyte fuel cell of the present invention, it is possible to significantly suppress generation of radicals such as the hydroxy radical (.OH) from the side reaction product such as hydrogen peroxide ($H_2O_2$) generated when the fuel gas and the oxide gas are supplied, in the reactions described above or the like. Thus, it is possible to prevent a gas leak between the fuel electrode film side and the oxide electrode film side by significantly reducing deterioration of the solid polyelectrolyte film in its periphery due to the radicals.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

With reference to the drawings, embodiments of a solid polyelectrolyte fuel cell according to the present invention will be described below. However, the present invention is not limited to the following embodiments.

First Embodiment

Figure 1:
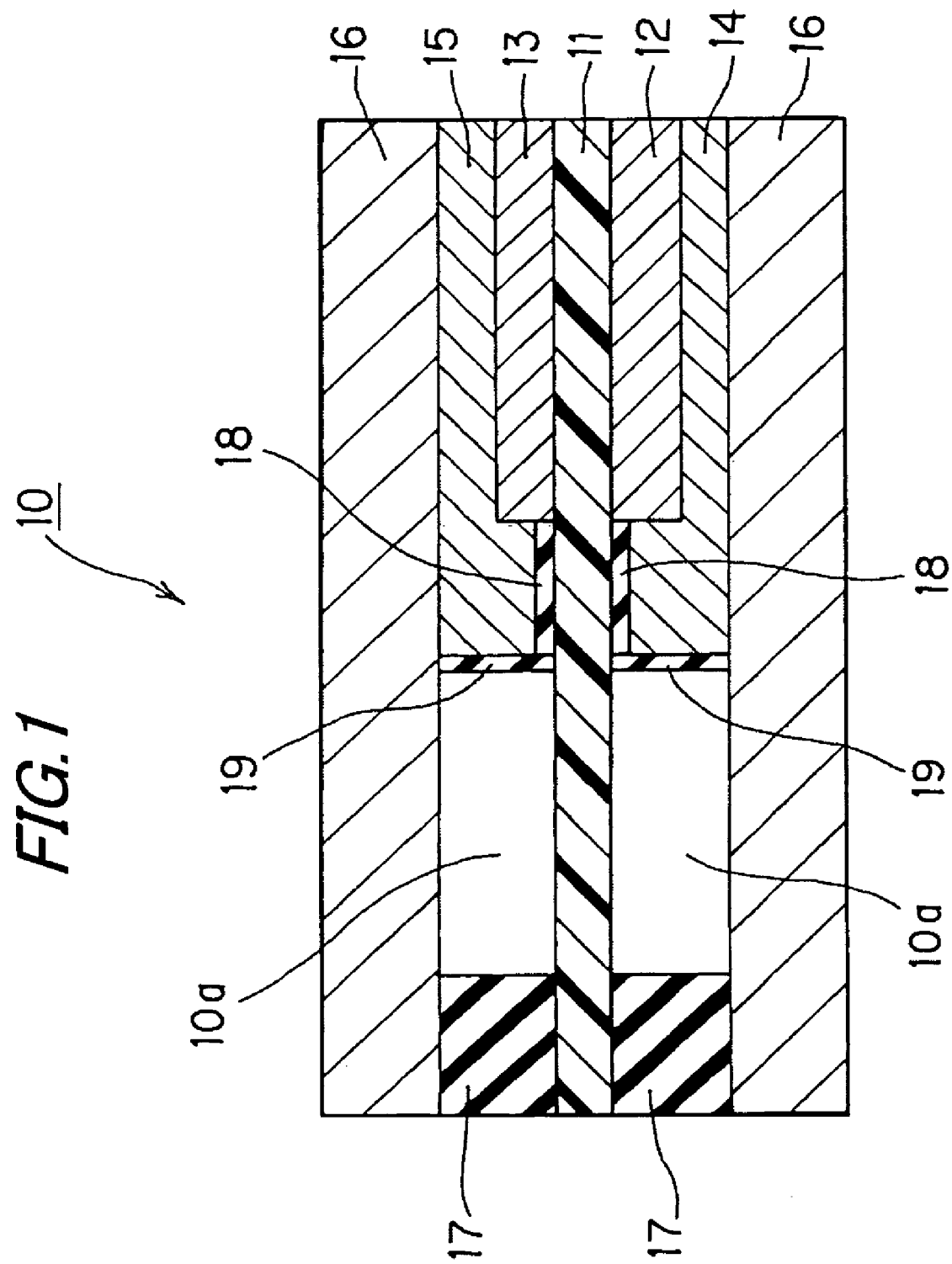
FIG. 1 shows a schematic diagram of a main part of a solid polyelectrolyte fuel cell according to a first embodiment of the present invention.

With reference to FIG. 1, a solid polyelectrolyte fuel cell according to a first embodiment of the present invention will be described. FIG. 1 is a schematic diagram of a main part of the solid polyelectrolyte fuel cell.

As shown in FIG. 1, on one side of a solid polyelectrolyte film 11 having proton ($H^+$) conductivity, a fuel electrode film 12 is attached, which contains catalytic metal such as Pt—Ru and has conductivity and gas permeability. On the other side of the solid polyelectrolyte film 11, an oxide electrode film 13 is attached, which contains catalytic metal such as Pt and has conductivity and gas permeability.

On a side of the fuel electrode film 12 that is an electrode film on one side of a solid polyelectrolyte film electrode conjugate (cell) including the solid polyelectrolyte film 11, the fuel electrode film 12, the oxide electrode film 13 and the like, a first gas diffusion layer 14 having conductivity and gas diffusivity is attached so as to surround and cover the fuel electrode film 12. In other words, the first gas diffusion layer 14, which is larger than the fuel electrode film 12, is attached to the fuel electrode film 12 so as to be positioned on the fuel electrode film 12 and the solid polyelectrolyte film 11. The first gas diffusion layer 14 is attached so as to also come into direct contact with the solid polyelectrolyte film 11. On a side of the oxide electrode film 13 that is an electrode film on the other side of the cell, a second gas diffusion layer 15 having conductivity and gas diffusivity is attached so as to surround and cover the oxide electrode film 13. In other words, the second gas diffusion layer 15, which is larger than the oxide electrode film 13, is attached to the oxide electrode film 13 so as to be positioned on the oxide electrode film 13 and the solid polyelectrolyte film 11.

On the one side and the other side of the cell, on which the gas diffusion layers 14 and 15 are attached, respectively, separators 16 having conductivity are provided, respectively. Specifically, in the separator 16 provided on the one side of the cell, a fuel gas passage for hydrogen gas and the like is formed. Moreover, in the separator 16 provided on the other side of the cell, an oxide gas passage for air, oxygen and the like is formed.

A periphery of the solid polyelectrolyte film 11, which is exposed from peripheral edges of the electrode films 12 and 13 and the gas diffusion layers 14 and 15, is held between the separators 16 with a pair of sealants 17 interposed therebetween.

Between the solid polyelectrolyte film 11 and the gas diffusion layers 14 and 15 positioned on the solid polyelectrolyte film 11, first insulating layers 18 are provided, which are first deterioration inhibitors having electrical insulating properties. Moreover, on peripheral edges of the gas diffusion layers 14 and 15, second insulating layers 19 are provided, which are second deterioration inhibitors having electrical insulating properties. Between the solid polyelectrolyte film 11 and the separators 16 between the sealants 17 and the second insulating layers 19, buffer spaces 10$a$ are provided.

Note that, in FIG. 1, the gas diffusion layers 14 and 15 are closely attached to end faces of the electrode films 12 and 13 without having spaces between the end faces thereof and the layers. However, in reality, the gas diffusion layers 14 and 15 may be attached to the solid polyelectrolyte film 11 with the insulating layers 18 and 19 interposed therebetween so as to be positioned on the solid polyelectrolyte film 11 while having spaces between the end faces of the electrode films 12 and 13 and the layers.

As materials of the insulating layers 18 and 19, the following resins, silicon materials and the like are cited. Specifically, the resins include: fluorine resins such as a polytetrafluoroethylene (PTFE) resin, a poly vinyl fluoride resin, a poly vinylidene fluoride resin, a polytetrafluoroethylene-perfluoro-alkylvinylether copolymer resin (PFA), an ethylene-polytetrafluoroethylene copolymer (FTFE), a polytetrafluoroethylene-ethylene hexafluoride copolymer (FEP), a polytetrafluoroethylene-propylene hexafluoride copolymer resin (PFEP), a polychlorotrifluoroethylene (PCTFE) resin, a polychlorotrifluoroethylene-ethylene copolymer (ECTFE) and a polytetrafluoroethylene-perfluoro-dioxol copolymer (TFE/PDD); polyethylene terephthalate (PET); polyether nitrile (PEN); polyphenylene sulfide (PPS); polyimide (PI); an ethylene-vinyl acetate copolymer (EVA); polyethylene (PE); polypropylene (PP); polyvinylidene chloride (PVDC); an ethylene vinyl alcohol copolymer (EVOH); thermoelastic polyurethane (TPU); cellulose triacetate (CTA); polyvinyl alcohol (PVA); polyacrylonitrile (PAN); polycarbonate (PC); polymethyl pentene (PMP); polyphenylene ether (PPE); polyethersulfone (PES); polysulfone (PS); and the like. However, the materials of the insulating layers are not limited to those described above.

In the solid polyelectrolyte fuel cell 10 according to this embodiment as described above, when fuel gas is supplied to the fuel gas passage of the separator 16 and oxide gas is supplied to the oxide gas passage of the separator 16, the fuel gas is supplied to the fuel electrode film 12 while being diffused in the first gas diffusion layer 14 and the oxide gas is supplied to the oxide electrode film 13 while being diffused in the second gas diffusion layer 15. Accordingly, the fuel gas and the oxide gas electrochemically react with each other in the cell. Thus, protons ($H^+$) generated from hydrogen gas on the fuel electrode film 12 side move toward the oxide electrode film 13 within the solid polyelectrolyte film 11. At the same time, electrons (e−) generated from the hydrogen gas on the fuel electrode film 12 side flow toward the oxide electrode film 13 through the separator 16 and the second gas diffusion layer 15 from the first gas diffusion layer 14 and the separator 16 via an external electric circuit. Thus, electricity can be generated while generating water by allowing oxygen to react with the protons and the electrons on the oxide electrode film 13 side.

Here, even if a side reaction product such as hydrogen peroxide ($H_2O_2$) is generated when the fuel gas and the oxide gas are supplied into the cell, in the reactions described above or the like, generation of radicals such as a hydroxy radical (.OH) from the side reaction product such as hydrogen peroxide can be significantly suppressed since the insulating layers 18 are provided between the solid polyelectrolyte film 11 and the gas diffusion layers 14 and 15 positioned above the solid polyelectrolyte film 11. Moreover, a gas leak between the fuel electrode film 12 side and the oxide electrode film 13 side can be prevented by significantly reducing deterioration on a peripheral side of the solid polyelectrolyte film 11 due to the radical. The reason for the above will be described below.

As described above, if the side reaction product such as hydrogen peroxide ($H_2O_2$) is generated when the fuel gas and the oxide gas are supplied into the cell, in the reactions described above or the like, radicals such as a hydroxy radical (.OH) are generated from the side reaction product such as hydrogen peroxide in the conventional solid polyelectrolyte fuel cell 110. Thus, the radicals may deteriorate the solid polyelectrolyte film 111 and cause a gas leak between the fuel electrode film 112 side and the oxide electrode film 113 side.

Thus, the inventors of the present invention have conducted a test for deterioration of the solid polyelectrolyte film due to the radicals as described above. As a result, it has been found out that the deterioration occurs more often in a periphery of the solid polyelectrolyte film 111 (a spot where the solid polyelectrolyte film comes into contact with the gas diffusion layers 114 and 115) than in a center of the solid polyelectrolyte film 111 (a spot where the solid polyelectrolyte film comes into contact with the electrode films 112 and 113).

As a result of further research and studies conducted by the inventors of the present invention on the cause for the above, it has been assumed that the deterioration of the solid polyelectrolyte film 111 described above occurs based on the following phenomena.

Specifically, the side reaction product such as hydrogen peroxide ($H_2O_2$) generated when the fuel gas and the oxide gas are supplied into the cell, in the reactions described above or the like is decomposed into water and oxygen by catalytic metal in the oxide electrode film 113 between the solid polyelectrolyte film 111 and the oxide electrode film 113 before generation of radicals such as a hydroxy radical (.OH). Thus, deterioration of the solid polyelectrolyte film 111 is suppressed (see the following formula (1)). However, between the solid polyelectrolyte film 111 and the gas diffusion layers 114 and 115, the side reaction product such as hydrogen peroxide ($H_2O_2$) immediately reacts with protons ($H^+$) and electrons (e−) to generate radicals such as the hydroxy radical (.OH). Thus, the solid polyelectrolyte film 111 is deteriorated (see the following formula (2)).

$$H_2O_2 \rightarrow H_2O + \tfrac{1}{2}O_2 \qquad (1)$$

$$H_2O_2 + H^+ + e^- \rightarrow .OH + H_2O \qquad (2)$$

Accordingly, in this embodiment, the insulating layers 18 are provided between the solid polyelectrolyte film 11 and the gas diffusion layers 14 and 15 positioned above the solid polyelectrolyte film 11 so as to prevent direct contact between the solid polyelectrolyte film 11 and the gas diffusion layers 14 and 15. Thus, supply of electrons from the gas diffusion layers 14 and 15 is prevented on contact surfaces (interfaces) between the solid polyelectrolyte film 11 and the gas diffusion layers 14 and 15. Accordingly, the reaction of the above formula (2) on the gas diffusion layers 14 and 15 is suppressed. Moreover, between the solid polyelectrolyte film 11 and the gas diffusion layers 14 and 15, generation of radicals such as a hydroxy radical (.OH) from the side reaction product such as hydrogen peroxide ($H_2O_2$) is prevented.

Therefore, according to this embodiment, the gas leak between the fuel electrode film 12 side and the oxide electrode film 13 side can be prevented by suppressing the deterioration of the solid polyelectrolyte film 11 on its peripheral side.

Moreover, the buffer spaces 10a are provided between the solid polyelectrolyte film 11 and the separators 16 between the sealants 17 and the second insulating layers 19. Thus, even if the solid polyelectrolyte film 11 is swollen with moisture, the peripheral side of the solid polyelectrolyte film 11 can be relaxed. Moreover, generation of winkles in the solid polyelectrolyte film 11 between the solid polyelectrolyte film 11 and the electrode films 12 and 13 can be suppressed. Thus, lowering of power generation efficiency can be prevented.

Even if the solid polyelectrolyte film 11 is swollen with moisture, the peripheral side of the solid polyelectrolyte film 11 is relaxed and the peripheral edges of the gas diffusion layers 14 and 15 come into contact with the peripheral side of the solid polyelectrolyte film 11, generation of radicals such as a hydroxy radical (.OH) from the side reaction product such as hydrogen peroxide ($H_2O_2$) can also be prevented. Specifically, since the insulating layers 19 are also provided on the peripheral edges of the gas diffusion layers 14 and 15, supply of electrons from the sides of gas diffusion layers 14 and 15 is prevented between (on interfaces between) the peripheral side of the solid polyelectrolyte film 11 and the peripheral edges of the gas diffusion layers 14 and 15. Accordingly, the reaction of the above formula (2) on the peripheral edges of the gas diffusion layers 14 and 15 is suppressed. Thus, the generation of radicals can be prevented between the peripheral side of the solid polyelectrolyte film 11 and the peripheral edges of the gas diffusion layers 14 and 15.

Second Embodiment

Figure 2:
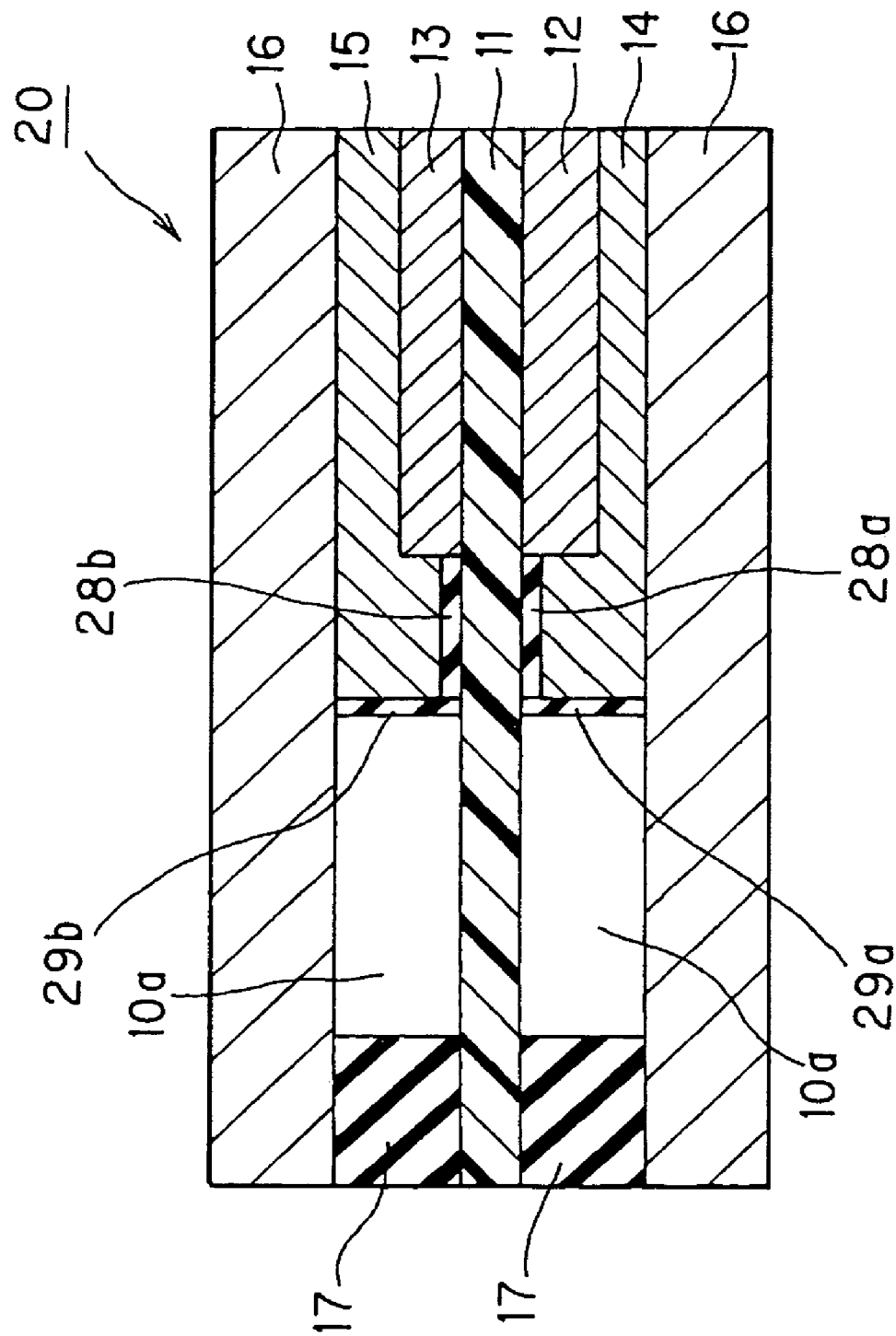
FIG. 2 shows a schematic diagram of a main part of a solid polyelectrolyte fuel cell according to a second embodiment of the present invention.

With reference to FIG. 2, a solid polyelectrolyte fuel cell according to a second embodiment of the present invention will be described. FIG. 2 is a schematic diagram of a main part of the solid polyelectrolyte fuel cell. Note that, as to the same parts as those in the case of the first embodiment described above, repetitive description of the items described in the first embodiment described above will be omitted by using the same reference numerals as those used in the above description of the first embodiment.

As shown in FIG. 2, between a solid polyelectrolyte film 11 and a first gas diffusion layer 14 positioned above the solid polyelectrolyte film 11, a first hydrogen peroxide decomposition layer 28a is provided, which is a first deterioration inhibitor containing catalytic metal such as Pt—Ru. On a peripheral edge of the first gas diffusion layer 14, a second hydrogen peroxide decomposition layer 29a is provided, which is a second deterioration inhibitor containing catalytic metal such as Pt—Ru.

Moreover, between the solid polyelectrolyte film 11 and a second gas diffusion layer 15 positioned above the solid polyelectrolyte film 11, a first hydrogen peroxide decomposition layer 28b is provided, which is a first deterioration inhibitor containing catalytic metal such as Pt. On a peripheral edge of the second gas diffusion layer 15, a second hydrogen peroxide decomposition layer 29b is provided, which is a second deterioration inhibitor containing catalytic metal such as Pt.

Specifically, in the first embodiment described above, the insulating layers 18 and 19 having electrical insulating properties are provided between the solid polyelectrolyte film 11 and the gas diffusion layers 14 and 15 positioned above the solid polyelectrolyte film 11 and on the peripheral edges of the gas diffusion layers 14 and 15 so as to prevent direct contact between the solid polyelectrolyte film 11 and the gas diffusion layers 14 and 15. Meanwhile, in this embodiment, the hydrogen peroxide decomposition layers 28a, 28b, 29a and 29b which decompose hydrogen peroxide into water and oxygen are provided between the solid polyelectrolyte film 11 and the gas diffusion layers 14 and 15 positioned above the solid polyelectrolyte film 11 and on the peripheral edges of the gas diffusion layers 14 and 15 so as to prevent direct contact between the solid polyelectrolyte film 11 and the gas diffusion layers 14 and 15.

In the solid polyelectrolyte fuel cell 20 according to this embodiment as described above, electric power can be obtained by operating as in the case of the first embodiment described above.

Here, even if a side reaction product such as hydrogen peroxide ($H_2O_2$) is generated when the fuel gas and the oxide gas are supplied into the cell, in the reactions described above or the like, generation of radicals such as a hydroxy radical (.OH) from the side reaction product such as hydrogen peroxide can be significantly suppressed since the hydrogen peroxide decomposition layers 28a and 28b are provided between the solid polyelectrolyte film 11 and the gas diffusion layers 14 and 15 positioned above the solid polyelectrolyte film 11. Moreover, a gas leak between the fuel electrode film 12 side and the oxide electrode film 13 side can be prevented by significantly reducing deterioration on a peripheral side of the solid polyelectrolyte film 11 due to the radical. The reason for the above will be described below.

As described above in the first embodiment, deterioration of the solid polyelectrolyte film due to the radicals occurs more often in a periphery of the solid polyelectrolyte film (a spot where the solid polyelectrolyte film comes into contact with the gas diffusion layers) than in a center of the solid polyelectrolyte film (a spot where the solid polyelectrolyte film comes into contact with the electrode films). This is because, as described above in the first embodiment, the side reaction product such as hydrogen peroxide ($H_2O_2$) is decomposed into water and oxygen by the catalytic metal in the electrode films between the solid polyelectrolyte film and the electrode films before generation of radicals such as a hydroxy radical (.OH) (see the formula (1)).

Thus, in this embodiment, the hydrogen peroxide decomposition layers 28a and 28b are provided between the solid polyelectrolyte film 11 and the gas diffusion layers 14 and 15 positioned above the solid polyelectrolyte film 11. Accordingly, before generation of the radicals such as a hydroxy radical (.OH) from the side reaction product such as hydrogen peroxide ($H_2O_2$) generated between the solid polyelectrolyte film 11 and the gas diffusion layers 14 and 15, the side reaction product such as hydrogen peroxide ($H_2O_2$) is decomposed into water and oxygen. Thus, the reaction of the formula (1) between the solid polyelectrolyte film 11 and the gas diffusion layers 14 and 15 is accelerated. In other words, the reaction of the formula (2) is suppressed to prevent generation of the radicals such as a hydroxy radical (.OH) from the side reaction product such as hydrogen peroxide ($H_2O_2$) between the solid polyelectrolyte film 11 and the gas diffusion layers 14 and 15.

Therefore, according to this embodiment, as in the case of the first embodiment described above, it is possible to suppress. a gas leak between the fuel electrode film 12 side and the oxide electrode film 13 side by suppressing deterioration of the solid polyelectrolyte film 11 on its peripheral side.

Moreover, even if the solid polyelectrolyte film 11 is swollen with moisture, the peripheral side of the solid polyelectrolyte film 11 is relaxed and the peripheral edges of the gas diffusion layers 14 and 15 come into contact with the peripheral side of the solid polyelectrolyte film 11, generation of radicals such as a hydroxy radical (.OH) from the side reaction product such as hydrogen peroxide ($H_2O_2$) can also be prevented. Specifically, since the hydrogen peroxide decomposition layers 29a and 29b are also provided on the peripheral edges of the gas diffusion layers 14 and 15, the side reaction product such as hydrogen peroxide ($H_2O_2$) is decomposed into water and oxygen before generation of the radicals such as a hydroxy radical (.OH) from the side reaction product such as hydrogen peroxide ($H_2O_2$) generated between the peripheral side of the solid polyelectrolyte film 11 and the peripheral edges of the gas diffusion layers 14 and 15. Accordingly, the reaction of the formula (2) between the peripheral side of the solid polyelectrolyte film 11 and the peripheral edges of the gas diffusion layers 14 and 15 is suppressed. Thus, the generation of radicals can be prevented between the peripheral side of the solid polyelectrolyte film 11 and the peripheral edges of the gas diffusion layers 14 and 15.

Note that, as the hydrogen peroxide decomposition layers 28a, 28b, 29a and 29b, one containing catalytic metal, activated carbon or the like, which accelerates decomposition of hydrogen peroxide into water and oxygen, may be used. Moreover, for example, one containing at least one kind of oxide, carbonate or phosphate among Ce, Tl, Mn, Ag, Yb and W may be used. Alternatively, one containing at least one kind of tungstate and the like among Ce, Tl, Mn, Ag and Yb may be used. Furthermore, conductivity, gas permeability and the like are not particularly required. However, the hydrogen peroxide decomposition layers 28a, 28b, 29a and 29b which are made of the same materials as those of the electrode films 12 and 13 are preferable since manufacturing can be simplified.

Third Embodiment

Figure 3:
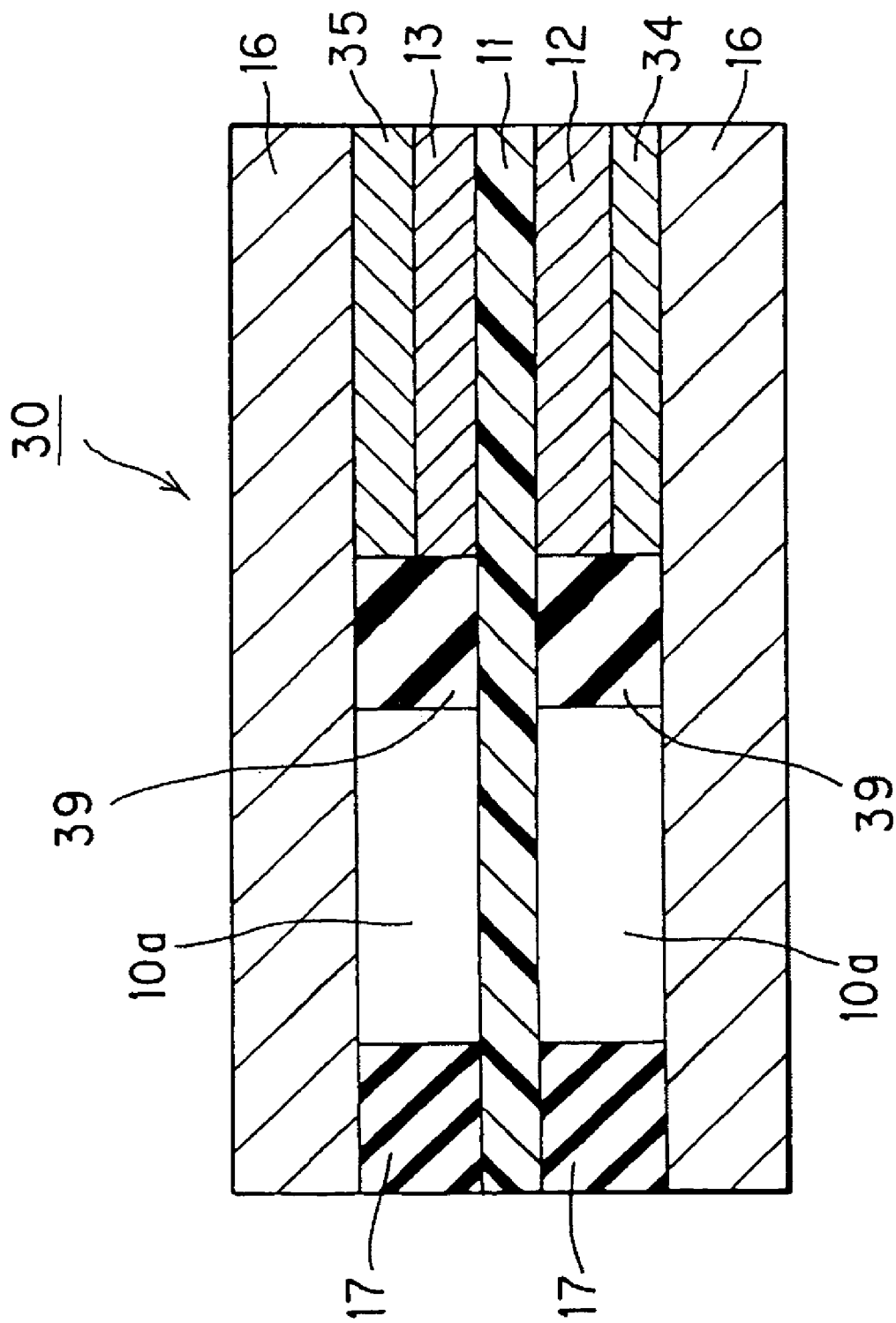
FIG. 3 shows a schematic diagram of a main part of a solid polyelectrolyte fuel cell according to a third embodiment of the present invention.

With reference to FIG. 3, a solid polyelectrolyte fuel cell according to a third embodiment of the present invention will be described. FIG. 3 is a schematic diagram of a main part of the solid polyelectrolyte fuel cell. Note that, as to the same parts as those in the cases of the first and second embodiments described above, repetitive description of the items described in the first and second embodiments described above will be omitted by using the same reference numerals as those used in the above description of the first and second embodiments.

As shown in FIG. 3, on a fuel electrode film 12 side of a cell, a first gas diffusion layer 34 having conductivity and gas diffusivity is attached so as to cover only a surface of the fuel electrode film 12, which is opposite to a contact surface with a solid polyelectrolyte film 11. On an oxide electrode film 13 side of the cell, a second gas diffusion layer 35 having conductivity and gas diffusivity is attached so as to cover only a surface of the oxide electrode film 13, which is opposite to a contact surface with the solid polyelectrolyte film 11.

On peripheral edges of the gas diffusion layers 34 and 35, spacers 39 which are second deterioration inhibitors having electrical insulating properties are provided so as to hold the solid polyelectrolyte film 11 positioned between the electrode films 12 and 13 and sealants 17.

As a material of the spacers 39, the same fluorine resins as those in the case of the insulating layers 18 and 19, other resins, silicon materials and the like are cited. However, the material is not limited to those described above.

Specifically, in the first embodiment described above, the gas diffusion layers 14 and 15 are positioned on the electrode films 12 and 13 and above the solid polyelectrolyte film 11, in other words, the gas diffusion layers 14 and 15 are larger than the electrode films 12 and 13. Moreover, the insulating layers 18 and 19 are provided between the solid polyelectrolyte film 11 and the gas diffusion layers 14 and 15 positioned above the solid polyelectrolyte film 11 and on the peripheral edges of the gas diffusion layers 14 and 15. Meanwhile, in this embodiment, the gas diffusion layers 34 and 35 are not positioned on the solid polyelectrolyte film 11 but exist only on the electrode films 12 and 13, in other words, the gas diffusion layers 34 and 35 having the same size as the electrode films 12 and 13 are adopted. Moreover, the spacers 39 are provided so as to be interposed between the peripheral side of the solid polyelectrolyte film 11 and the peripheral edges of the gas diffusion layers 34 and 35.

In the solid polyelectrolyte fuel cell 30 according to this embodiment as described above, electric power can be obtained by operating as in the cases of the first and second embodiments described above.

Here, even if a side reaction product such as hydrogen peroxide ($H_2O_2$) is generated when fuel gas and oxide gas are supplied into the cell, in the reactions described above or the like, generation of radicals such as a hydroxy radical (.OH) from the side reaction product such as hydrogen peroxide ($H_2O_2$) on the gas diffusion layers 34 and 35 can be significantly suppressed. This is because the gas diffusion layers 34 and 35 have the same size as the electrode films 12 and 13, in other words, the gas diffusion layers 34 and 35 do not come into direct contact with the solid polyelectrolyte film 11.

Thus, as in the case of the first embodiment described above, no electrons are supplied to the solid polyelectrolyte film 11.

Therefore, according to this embodiment, as in the cases of the first and second embodiments described above, it is possible to suppress a gas leak between the fuel electrode film 12 side and the oxide electrode film 13 side by suppressing deterioration of the solid polyelectrolyte film 11 on its peripheral side.

Moreover, even if the solid polyelectrolyte film 11 is swollen with moisture, the peripheral side of the solid polyelectrolyte film 11 is relaxed and the peripheral edges of the gas diffusion layers 34 and 35 come into contact with the peripheral side of the solid polyelectrolyte film 11, generation of radicals such as a hydroxy radical (.OH) from the side reaction product such as hydrogen peroxide ($H_2O_2$) can also be prevented. Specifically, since the spacers 39 are interposed between the peripheral side of the solid polyelectrolyte film 11 and the peripheral edges of the gas diffusion layers 34 and 35, supply of electrons from the edges of the gas diffusion layers 34 and 35 is prevented between (on interfaces between) the peripheral side of the solid polyelectrolyte film 11 and the peripheral edges of the gas diffusion layers 34 and 35. Accordingly, the reaction of the formula (2) on the peripheral edges of the gas diffusion layers 34 and 35 is suppressed. Thus, the generation of radicals can be prevented between the peripheral side of the solid polyelectrolyte film 11 and the peripheral edges of the gas diffusion layers 34 and 35.

Fourth Embodiment

Figure 4:
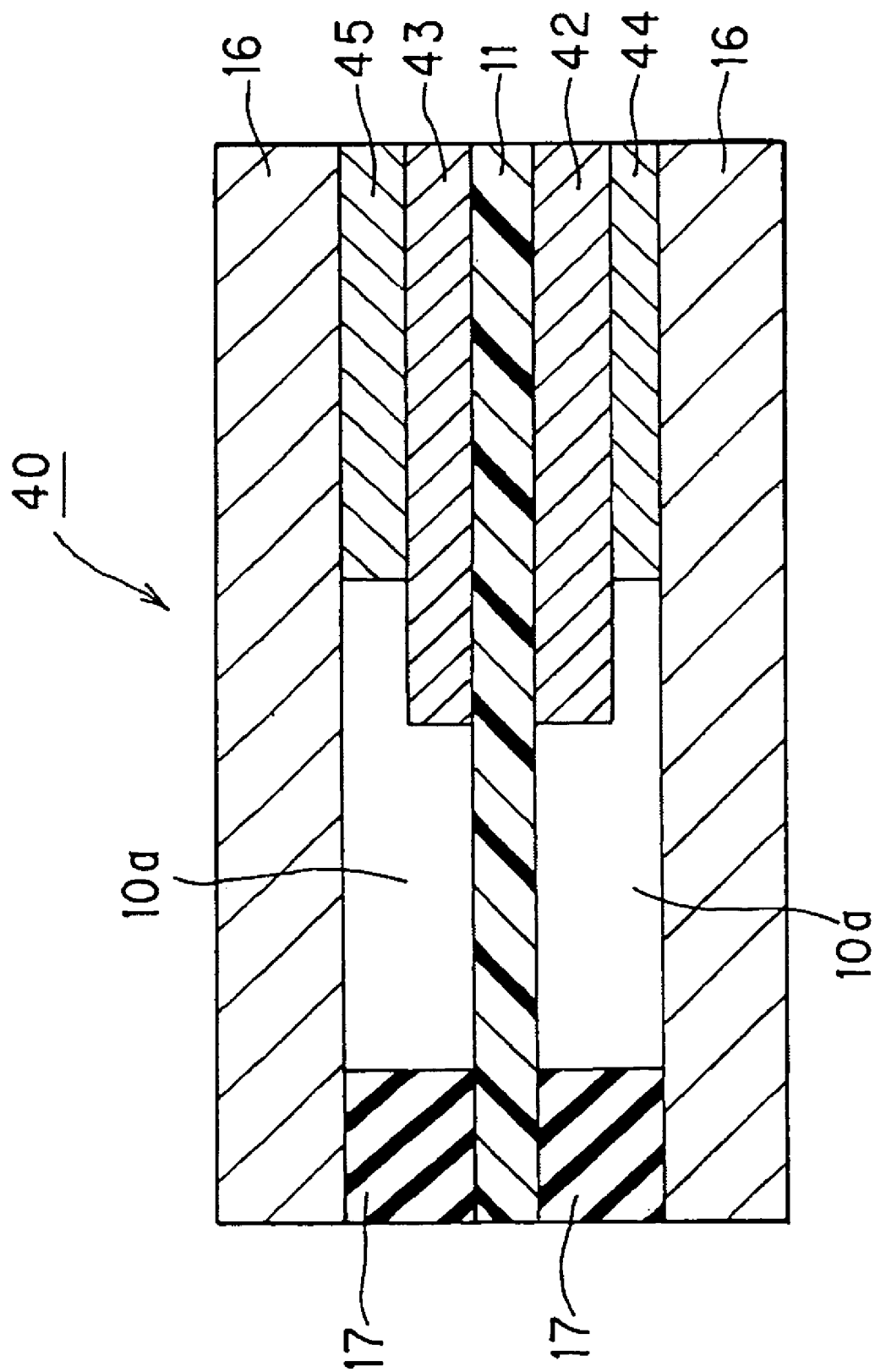
FIG. 4 shows a schematic diagram of a main part of a solid polyelectrolyte fuel cell according to a fourth embodiment of the present invention.

With reference to FIG. 4, a solid polyelectrolyte fuel cell according to a fourth embodiment of the present invention will be described. FIG. 4 is a schematic diagram of a main part of the solid polyelectrolyte fuel cell. Note that, as to the same parts as those in the cases of the first to third embodiments described above, repetitive description of the items described in the first to third embodiments described above will be omitted by using the same reference numerals as those used in the above description of the first to third embodiments.

As shown in FIG. 4, as to a fuel electrode film 42 of a cell, a size thereof in a planar direction perpendicular to a lamination direction is larger than that of a first gas diffusion layer 44. Moreover, as to an oxide electrode film 43 of the cell, a size thereof in the planar direction perpendicular to the lamination direction is larger than that of a second gas diffusion layer 45.

Specifically, in the third embodiment described above, the electrode films 12 and 13 and the gas diffusion layers 34 and 35 have the same size. Meanwhile, in this embodiment, the gas diffusion layers 44 and 45 are smaller than the electrode films 42 and 43. In other words, peripheries of the electrode films 42 and 43 are extended more than those of the gas diffusion layers 44 and 45.

In the solid polyelectrolyte fuel cell 40 according to this embodiment as described above, electric power can be obtained by operating as in the cases of the first to third embodiments described above.

Here, even if a side reaction product such as hydrogen peroxide ($H_2O_2$) is generated when the fuel gas and the oxide gas are supplied into the cell, in the reactions described above or the like, the solid polyelectrolyte film 11 never comes into direct contact with peripheral edges of the gas diffusion layers 44 and 45 as in the case of the third embodiment described above since the peripheries of the electrode films 42 and 43 are extended more than those of the gas diffusion layers 44 and 45. Moreover, as in the case of the second embodiment described above, generation of radicals such as a hydroxy radical (.OH) from the side reaction product such as hydrogen peroxide can be significantly suppressed. Thus, it is possible to prevent a gas leak between the fuel electrode film 42 side and the oxide electrode film 43 side by significantly reducing deterioration of the solid polyelectrolyte film 11 on its peripheral side due to the radical. The reason for the above will be described below.

As described above in the first embodiment, deterioration of the solid polyelectrolyte film due to the radicals occurs more often in a periphery of the solid polyelectrolyte film (a spot where the solid polyelectrolyte film comes into contact with the gas diffusion layers) than in a center of the solid polyelectrolyte film (a spot where the solid polyelectrolyte film comes into contact with the electrode films). This is because, as described above in the first embodiment, the side reaction product such as hydrogen peroxide ($H_2O_2$) is decomposed into water and oxygen by the catalytic metal in the electrode films between the solid polyelectrolyte film and the electrode films before generation of radicals such as a hydroxy radical (.OH) (see the formula (1)).

Thus, in this embodiment, the peripheries of the electrode films 42 and 43 are extended more than those of the gas diffusion layers 44 and 45. In other words, instead of the first hydrogen peroxide decomposition layers 28a and 28b in the second embodiment described above, the peripheries of the electrode films 42 and 43 are set to be first deterioration inhibitors. Thus, as in the case of the second embodiment described above, before generation of the radicals such as a hydroxy radical (.OH) from the side reaction product such as hydrogen peroxide ($H_2O_2$), the side reaction product such as hydrogen peroxide ($H_2O_2$) is decomposed into water and oxygen. Accordingly, generation of the radicals such as a hydroxy radical (.OH) from the side reaction product such as hydrogen peroxide ($H_2O_2$) is prevented. Moreover, since the gas diffusion layers 44 and 45 do not come into direct contact with the solid polyelectrolyte film 11, no electrons are supplied to the solid polyelectrolyte film 11 as in the case of the third embodiment described above. Thus, generation of the radicals such as a hydroxy radical (.OH) from the side reaction product such as hydrogen peroxide ($H_2O_2$) on the gas diffusion layers 44 and 45 is prevented.

Therefore, according to this embodiment, as in the cases of the first to third embodiments described above, it is possible to suppress a gas leak between the fuel electrode film 42 side and the oxide electrode film 43 side by suppressing deterioration of the solid polyelectrolyte film 11 on its peripheral side.

Moreover, even if the solid polyelectrolyte film 11 is swollen with moisture, the peripheral side of the solid polyelectrolyte film 11 is relaxed and the peripheral edges of the gas diffusion layers 44 and 45 come into contact with the peripheral side of the solid polyelectrolyte film 11, the peripheral edges of the gas diffusion layers 44 and 45 and the peripheral side of the solid polyelectrolyte film 11 can be prevented from coming into contact with each other since the peripheries of the electrode films 42 and 43 are extended more than those of the gas diffusion layers 44 and 45.

Fifth Embodiment

Figure 5:
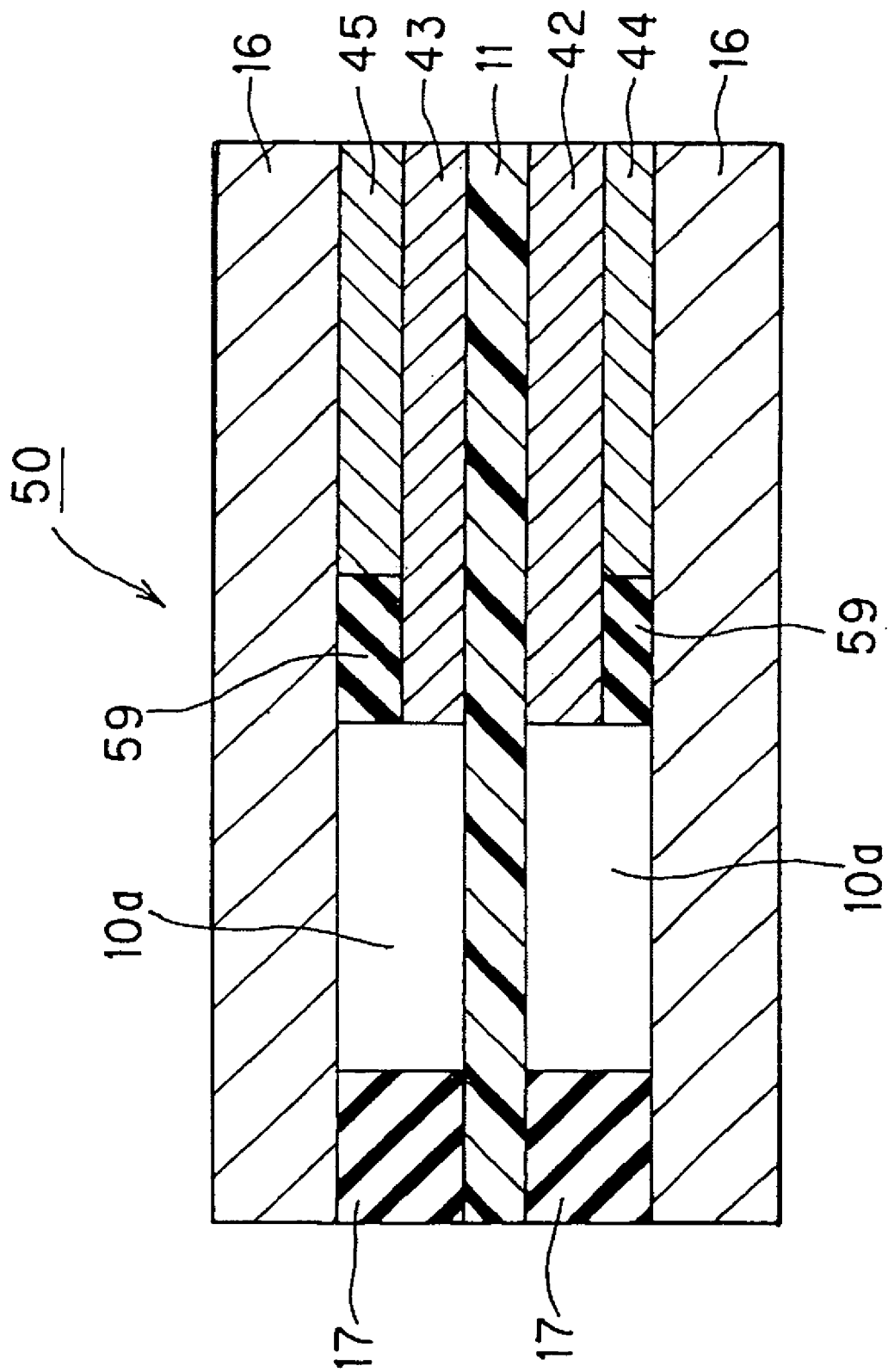
FIG. 5 shows a schematic diagram of a main part of a solid polyelectrolyte fuel cell according to a fifth embodiment of the present invention.

With reference to FIG. 5, a solid polyelectrolyte fuel cell according to a fifth embodiment of the present invention will be described. FIG. 5 is a schematic diagram of a main part of the solid polyelectrolyte fuel cell. Note that, as to the same parts as those in the cases of the first to fourth embodiments described above, repetitive description of the items described in the first to fourth embodiments described above will be omitted by using the same reference numerals as those used in the above description of the first to fourth embodiments.

As shown in FIG. 5, on peripheral edges of gas diffusion layers 44 and 45, spacers 59 which are second deterioration inhibitors having electrical insulating properties are provided so as to be positioned between extended electrode films 42 and 43 and separators 16.

As a material of the spacers 59, the same fluorine resins as those in the case of the insulating layers 18 and 19, other resins, silicon materials and the like are cited. However, the material is not limited to those described above.

Specifically, the solid polyelectrolyte fuel cell 50 according to this embodiment is one obtained by providing the spacers 59 on the peripheral edges of the gas diffusion layers 44 and 45, as in the case of the third embodiment described above, in the solid polyelectrolyte fuel cell 40 according to the fourth embodiment described above.

Therefore, according to this embodiment, as in the cases of the first to fourth embodiments described above, it is possible, as a matter of course, to prevent a gas leak between the fuel electrode film 42 side and the oxide electrode film 43 side by suppressing deterioration of the solid polyelectrolyte film 11 on its peripheral side. Even if the solid polyelectrolyte film 11 is swollen with moisture, the peripheral side of the solid polyelectrolyte film 11 is relaxed and the peripheral edges of the gas diffusion layers 44 and 45 come into contact with the peripheral side of the solid polyelectrolyte film 11, it is possible to more surely prevent the peripheral edges of the gas diffusion layers 44 and 45 and the peripheral side of the solid polyelectrolyte film 11 from coming into contact with each other, compared with the case of the fourth embodiment described above.

Sixth Embodiment

Figure 6:
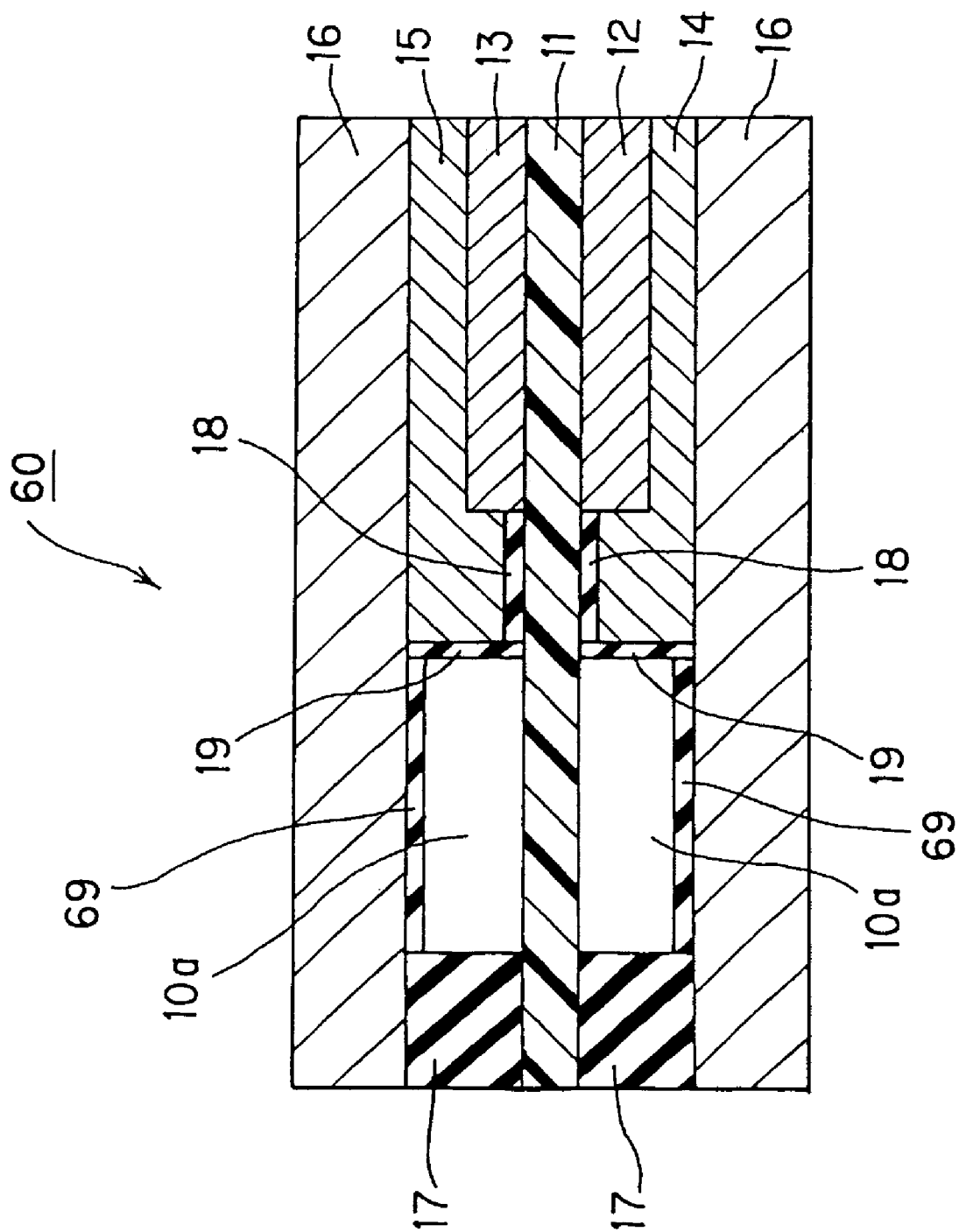
FIG. 6 shows a schematic diagram of a main part of a solid polyelectrolyte fuel cell according to a sixth embodiment of the present invention.

With reference to FIG. 6, a solid polyelectrolyte fuel cell according to a sixth embodiment of the present invention will be described. FIG. 6 is a schematic diagram of a main part of the solid polyelectrolyte fuel cell. Note that, as to the same parts as those in the cases of the first to fifth embodiments described above, repetitive description of the items described in the first to fifth embodiments described above will be omitted by using the same reference numerals as those used in the above description of the first to fifth embodiments.

As shown in FIG. 6, in buffer spaces 10a, third insulating layers 69 which are third deterioration inhibitors having electrical insulating properties are provided so as to be adjacent to separators 16.

As a material of the third insulating layers 69, the same fluorine resins as those in the case of the insulating layers 18 and 19, other resins, silicon materials and the like are cited. However, the material is not limited to those described above.

Specifically, the solid polyelectrolyte fuel cell 60 according to this embodiment is one obtained by providing the third insulating layers 69 adjacent to the separators 16 in the buffer spaces 10a so as to separate between the solid polyelectrolyte film 11 and the separators 16 in the solid polyelectrolyte fuel cell 10 according to the first embodiment described above.

In the solid polyelectrolyte fuel cell 60 according to this embodiment as described above, when fuel gas and oxide gas are supplied into the cell, in the reactions described above or the like, even if a side reaction product such as hydrogen peroxide ($H_2O_2$) is generated and, by any chance, diffused into the separators 16 and, at the same time, the solid polyelectrolyte film 11 is swollen with moisture, the peripheral side of the solid polyelectrolyte film 11 is relaxed and the peripheral side of the solid polyelectrolyte film 11 comes into contact with the separators 16, generation of radicals such as a hydroxy radical (.OH) from a side reaction product such as hydrogen peroxide ($H_2O_2$) can be prevented. Specifically, the third insulating layers 69 are provided on the separators 16 in the buffer spaces 10a so as to separate between the solid polyelectrolyte film 11 and the separators 16. Thus, supply of electrons from the separators 16 is prevented between the solid polyelectrolyte film 11 and the separators 16. Accordingly, the reaction of the formula (2) on the solid polyelectrolyte film 11 is suppressed. Consequently, generation of the radicals can be prevented between the solid polyelectrolyte film 11 and the separators 16.

Therefore, according to this embodiment, as in the cases of the first to fifth embodiments described above, it is possible, as a matter of course, to prevent a gas leak between the fuel electrode film 12 side and the oxide electrode film 13 side by suppressing deterioration of the solid polyelectrolyte film 11 on its peripheral side. Even if the solid polyelectrolyte film 11 is swollen with moisture, the peripheral side of the solid polyelectrolyte film 11 is relaxed and the peripheral side of the solid polyelectrolyte film 11 comes into contact with the separators 16, it is possible to more surely prevent the deterioration of the solid polyelectrolyte film 11 on its peripheral side, compared with the cases of the first to fifth embodiments described above.

Note that there is no particular problem even if spaces are formed between the third insulating layers 69 and the separators 16 adjacent thereto.

Seventh Embodiment

Figure 7:
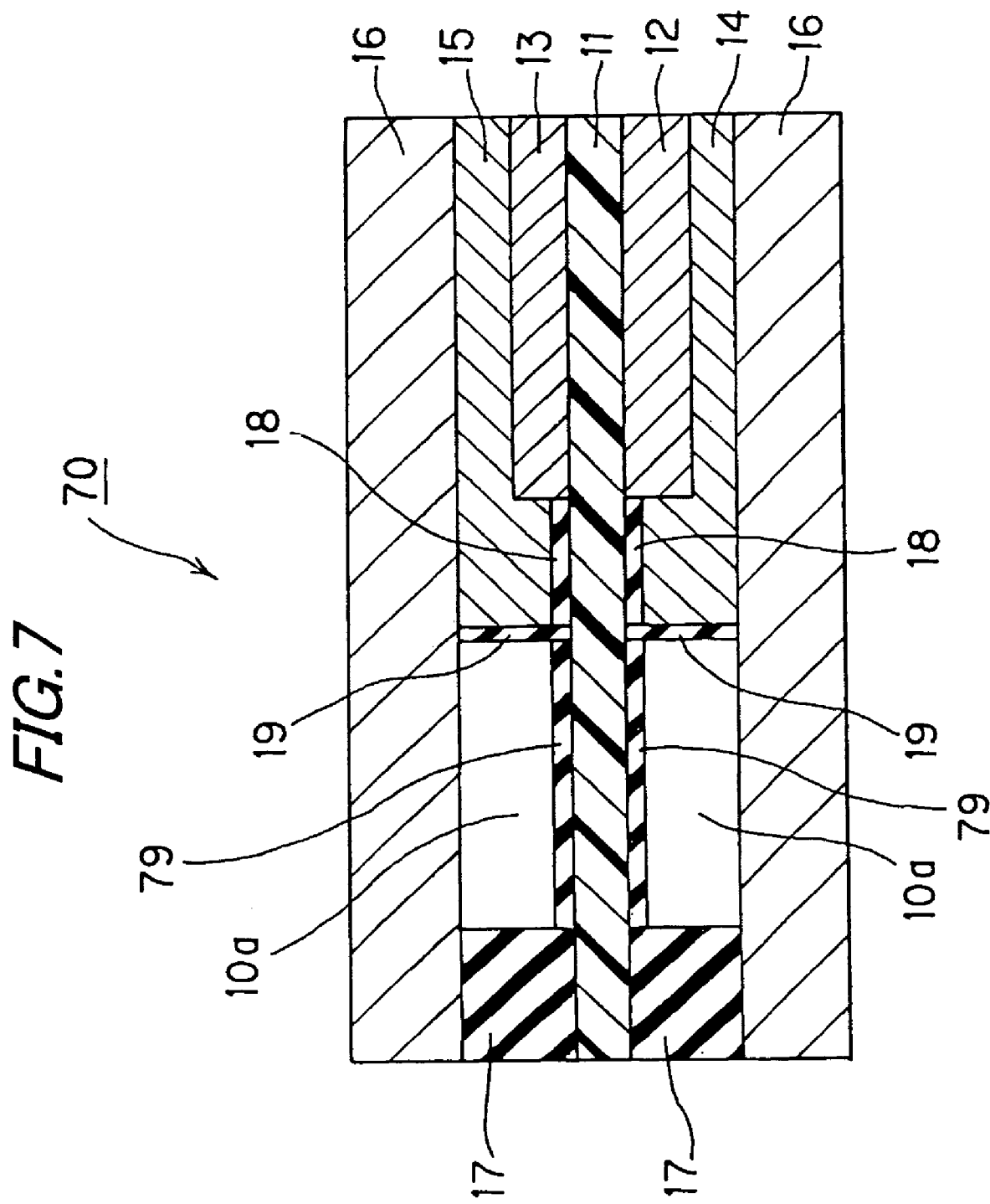
FIG. 7 shows a schematic diagram of a main part of a solid polyelectrolyte fuel cell according to a seventh embodiment of the present invention.

With reference to FIG. 7, a solid polyelectrolyte fuel cell according to a seventh embodiment of the present invention will be described. FIG. 7 is a schematic diagram of a main part of the solid polyelectrolyte fuel cell. Note that, as to the same parts as those in the cases of the first to sixth embodiments described above, repetitive description of the items described in the first to sixth embodiments described above will be omitted by using the same reference numerals as those used in the above description of the first to sixth embodiments.

As shown in FIG. 7, in buffer spaces 10a, third insulating layers 79 which are third deterioration inhibitors having electrical insulating properties are provided so as to be adjacent to a solid polyelectrolyte film 11.

Specifically, in the solid polyelectrolyte fuel cell 60 according to the sixth embodiment described above, the third insulating layers 69 are provided adjacent to the separators 16 in the buffer spaces 10a so as to separate between the solid polyelectrolyte film 11 and the separators 16. Meanwhile, in the solid polyelectrolyte fuel cell 70 according to this embodiment, the third insulating layers 79 are provided adjacent to the solid polyelectrolyte film 11 in the buffer spaces 10a so as to separate between the solid polyelectrolyte film 11 and the separators 16.

Therefore, according to this embodiment, the same effects as those in the case of the sixth embodiment described above can be obtained.

Note that there is no particular problem even if spaces are formed between the third insulating layers 79 and the solid polyelectrolyte film 11 adjacent thereto.

Other Embodiments

In the third and fifth embodiments described above, the spacers 39 and 59 having electrical insulating properties are used. Meanwhile, instead of the spacers 39 and 59, for example, spacers which are second deterioration inhibitors containing catalytic metal, activated carbon or the like for accelerating decomposition of hydrogen peroxide into water and oxygen are used. Thus, even if the solid polyelectrolyte film 11 is swollen with moisture, the peripheral side of the solid polyelectrolyte film 11 is relaxed and the peripheral edges of the gas diffusion layers 34, 35, 44 and 45 come into contact with the peripheral side of the solid polyelectrolyte film 11, the side reaction product such as hydrogen peroxide ($H_2O_2$) is decomposed into water and oxygen before generation of radicals such as a hydroxy radical (.OH) from the side reaction product such as hydrogen peroxide ($H_2O_2$) generated between the peripheral side of the solid polyelectrolyte film 11 and the peripheral edges of the gas diffusion layers 34, 35, 44 and 45. Accordingly, the reaction of the formula (2) is suppressed between the peripheral side of the solid polyelectrolyte film 11 and the peripheral edges of the gas diffusion layers 34, 35, 44 and 45. Thus, it is also possible to prevent generation of the radicals such as a hydroxy radical (.OH) from the side reaction product such as hydrogen peroxide ($H_2O_2$) between the peripheral side of the solid polyelectrolyte film 11 and the peripheral edges of the gas diffusion layers 34, 35, 44 and 45.

Moreover, in the sixth and seventh embodiments described above, the third insulating layers 69 and 79 having electrical insulating properties are used. Meanwhile, instead of the third insulating layers 69 and 79, for example, third hydrogen peroxide decomposition layers are used, which are third deterioration inhibitors containing catalytic metal, activated carbon or the like which acclelerates decomposition of hydrogen peroxide into water and oxygen, or at least one kind of oxide, carbonate or phosphate among Ce, Tl, Mn, Ag, Yb and W or at least one kind of tungstate and the like among Ce, Tl, Mn, Ag and Yb may be used. Thus, as in the case described above, it is also possible to prevent generation of radicals such as a hydroxy radical (.OH) from the side reaction product such as hydrogen peroxide ($H_2O_2$).

Figure 8:
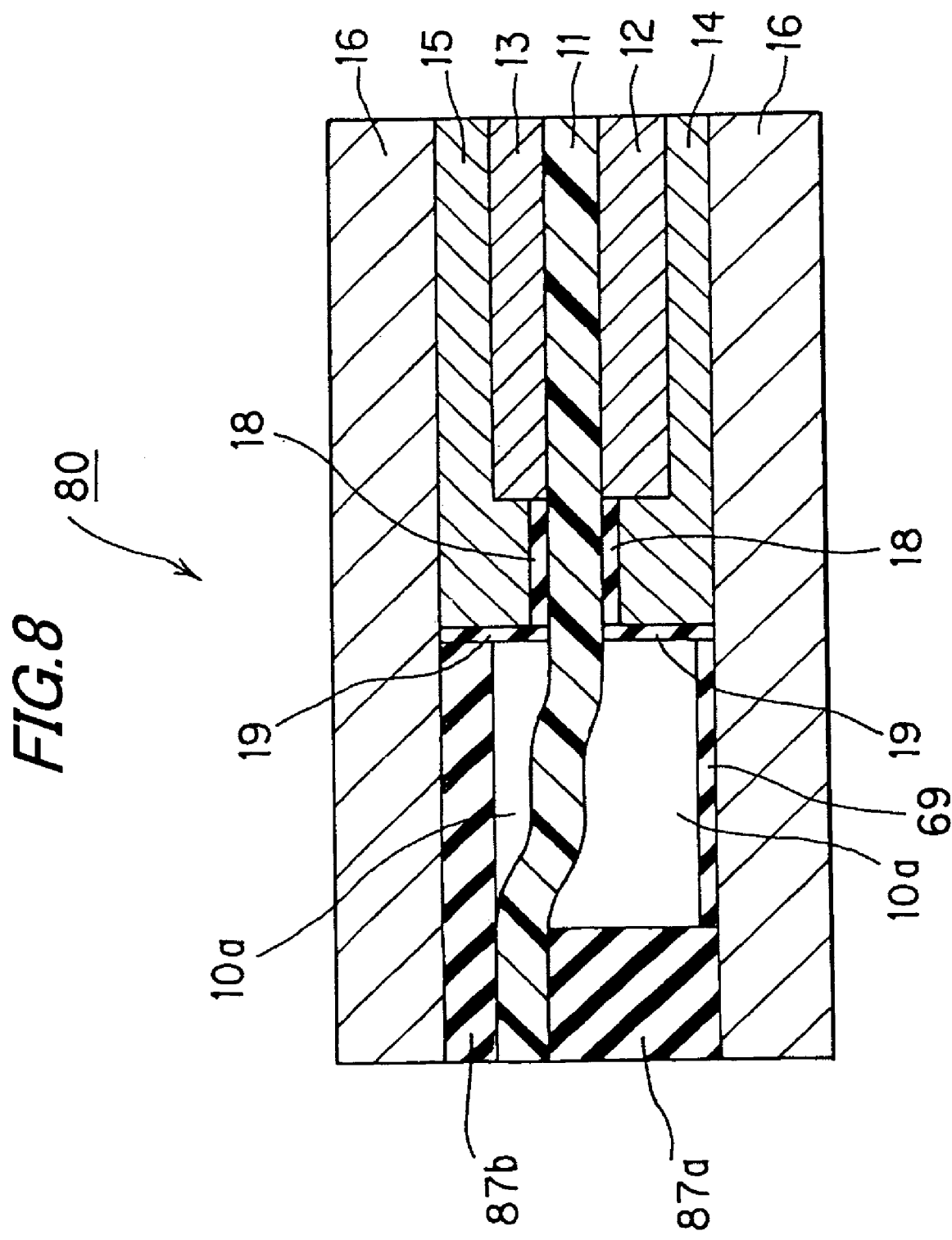
FIG. 8 shows a schematic diagram of a main part of a solid polyelectrolyte fuel cell according to another embodiment of the present invention.

Moreover, in the sixth and seventh embodiments described above, the description was given of the cases of the solid polyelectrolyte fuel cells 60 and 70 in which the third insulating layers 69 and 79 are provided, as the third deterioration inhibitors, adjacent to the separators 16 or the solid polyelectrolyte film 11 in the buffer spaces 10a so as to separate between the solid polyelectrolyte film 11 and the separators 16. Meanwhile, it is also possible to obtain a solid polyelectrolyte fuel cell 80 in which a sealant 87b extended to the separator 16 portion in the buffer space 10a so as to separate between the solid polyelectrolyte film 11 and the separator 16 is adopted as one of the third deterioration inhibitors, for example, instead of one of the third insulating layers 69 and 79, as shown in FIG. 8. Here, in order to surely form the buffer spaces 10a, it is preferable that a sealant 87a having a thickness larger than that of the sealant 87b is adopted as the other third deterioration inhibitor. Note that, as the sealants 87a and 87b, silicon rubber, fluorine rubber (for example, "Viton (registered trademark)" manufactured by DuPont Dow Elastomer Japan Co. Ltd.) and the like with electrical insulating properties and sealing properties can be used.

Moreover, in the first to third embodiments described above, the insulating layers 19, the hydrogen peroxide decomposition layers 29a and 29b or the spacers 39 are provided at the peripheral edges of the gas diffusion layers 14, 15, 34 and 35. However, it is also possible to omit the insulating layers 19, the hydrogen peroxide decomposition layers 29a and 29b or the spacers 39 in the case where the peripheral edges of the gas diffusion layers 14, 15, 34 and 35 never come into contact with the peripheral side of the solid polyelectrolyte film 11. However, even in such a case, in order to improve safety, it is preferable to provide the insulating layers 19, the hydrogen peroxide decomposition layers 29a and 29b or the spacers 39 as in the cases of the first to third embodiments described above.

Moreover, in the first to seventh embodiments described above, on the both sides of the fuel electrode films 12 and 42 and the oxide electrode films 13 and 43, the insulating layers 18, 19, 69 and 79, the hydrogen peroxide decomposition layers 28a, 28b, 29a and 29b, or the spacers 39 and 59 are provided. Moreover, the gas diffusion layers 34, 35, 44 and 45, which have the same size as the electrode films 12 and 13 or are smaller than the electrode films 42 and 43, are adopted. However, sufficient effects might be obtained only by providing the insulating layers 18, 19, 69 and 79, the hydrogen peroxide decomposition layers 28a and 29a or the spacers 39 and 59 only on the fuel electrode film 12 side where the reaction of the formula (2) is likely to occur in terms of potentials or only by adopting the first gas diffusion layers 34 and 44 which have the same size as the fuel electrode film 12 or are smaller than the fuel electrode film 42. Note that, depending on various conditions, sufficient effects might be obtained only by providing the insulating layers 18, 19, 69 and 79, the hydrogen peroxide decomposition layers 28b and 29b or the spacers 39 and 59 only on the oxide electrode film 13 side or only by adopting the second gas diffusion layers 35 and 45 which have the same size as the oxide electrode film 13 or are smaller than the oxide electrode film 43. However, even in such cases, in order to improve safety, it is preferable to provide the insulating layers 18, 19, 69 and 79, the hydrogen peroxide decomposition layers 28a, 28b, 29a and 29b or the spacers 39 and 59 on the both sides of the fuel electrode films 12 and 42 and the oxide electrode films 13 and 43 or to adopt the gas diffusion layers 34, 35, 44 and 45 which have the same size as the electrode films 12 and 13 or are smaller than the electrode films 42 and 43 as in the cases of the first to seventh embodiments described above.

Figure 9:
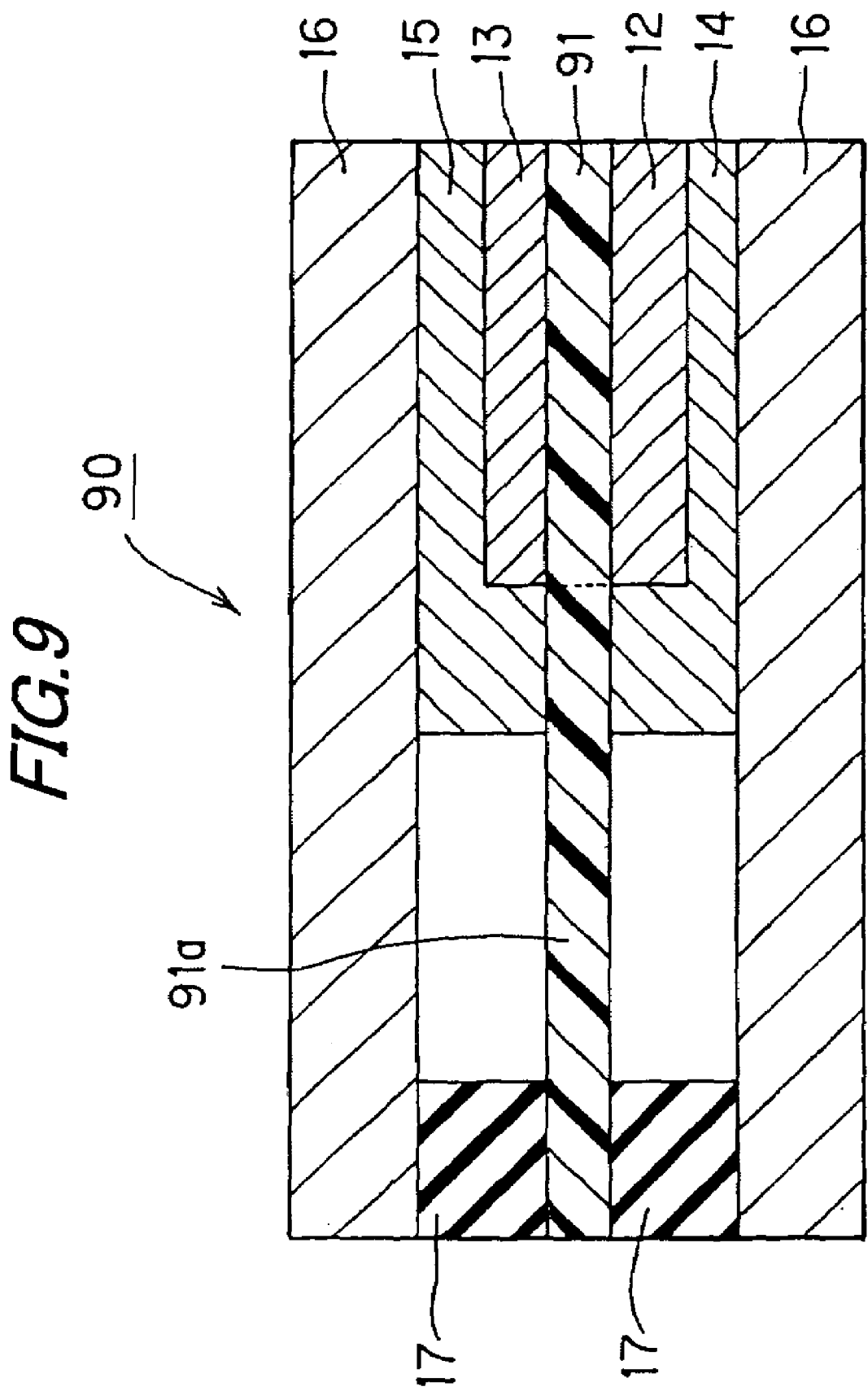
FIG. 9 shows a schematic diagram of a main part of a solid polyelectrolyte fuel cell according to still another embodiment of the present invention.
Figure 10:
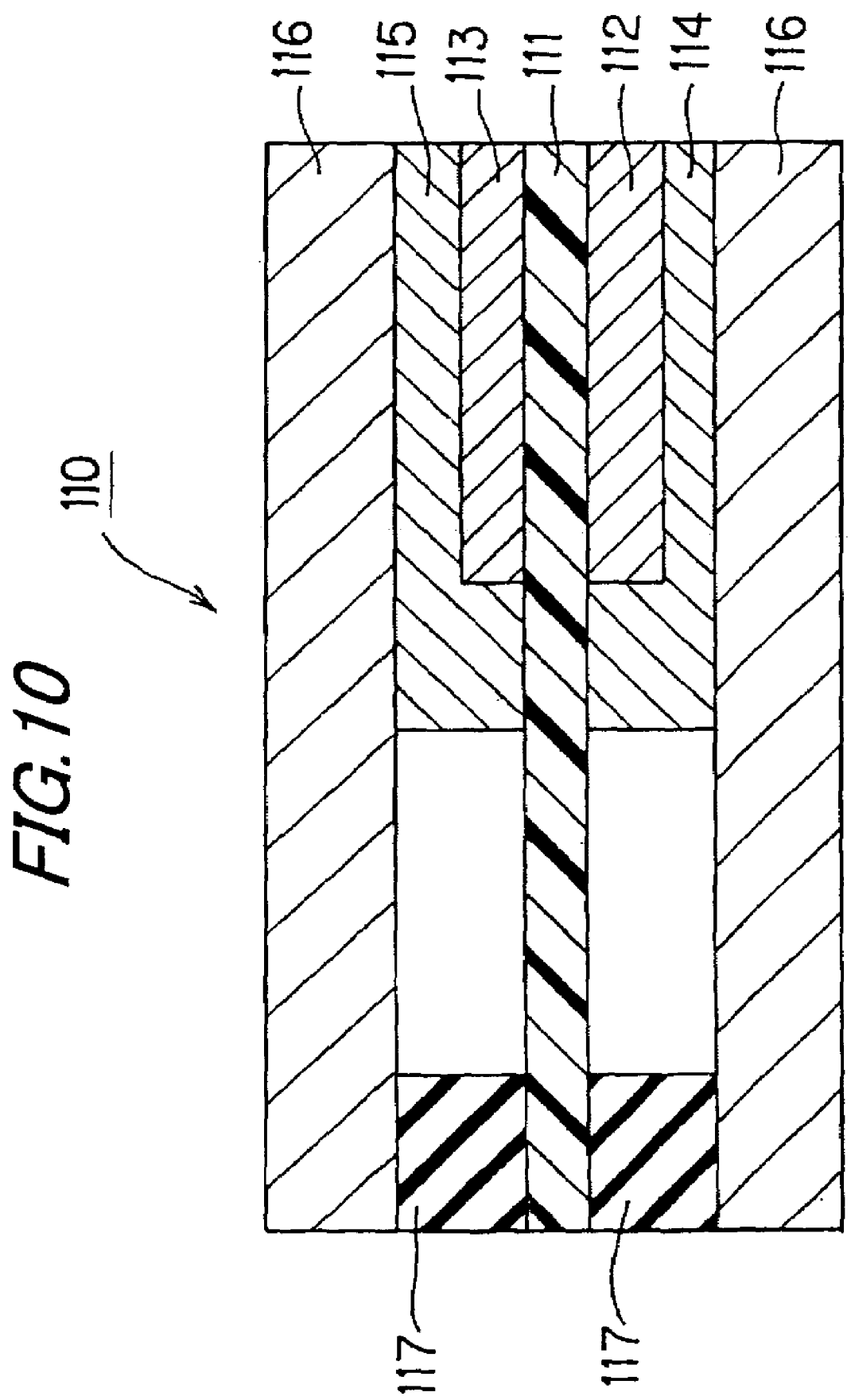
FIG. 10 shows a schematic diagram of an example of a main part of a conventional solid polyelectrolyte fuel cell.

Moreover, for example, as shown in FIG. 9, a solid polyelectrolyte fuel cell 90 is obtained, in which a peripheral portion 91a of a solid polyelectrolyte film 91 exposed from the electrode films 12 and 13 in the cell contains a deterioration inhibitor (for example, at least one kind of metal ion among Ce, Tl, Mn, Ag, Yb and W) which suppresses generation of radicals by decomposing hydrogen peroxide into water and oxygen. Thus, it is also possible to suppress a gas leak between the fuel electrode film 12 side and the oxide electrode film 13 side by suppressing deterioration in the peripheral portion 91a of the solid polyelectrolyte film 91.

A solid polyelectrolyte fuel cell according to the present invention can be very effectively utilized in various industries.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solid polyelectrolyte fuel cell comprising:
a solid polyelectrolyte film electrode conjugate in which electrode films are provided on one side and the other side of a solid polyelectrolyte film, respectively;
a first gas diffusion layer provided so as to cover the electrode film on one side of the solid polyelectrolyte film electrode conjugate;
a second gas diffusion layer provided so as to cover the electrode film on the other side of the solid polyelectrolyte film electrode conjugate; and
separators provided on the one side and the other side of the solid polyelectrolyte film electrode conjugate, respectively, with the gas diffusion layers interposed therebetween,
wherein a first deterioration inhibitor is provided between the solid polyelectrolyte film of the solid polyelectrolyte film electrode conjugate and at least one of the first and second gas diffusion layers so as to prevent direct contact between the solid polyelectrolyte film and at least one of the first and second gas diffusion layers, and which inhibits generation of radicals between the solid polyelectrolyte film and at least one of the first and second gas diffusion layers; and
wherein a second deterioration inhibitor is provided in peripheral ends of the solid polyelectrolyte film of the solid polyelectrolyte film electrode conjugate and at least one of the first and second gas diffusion layers so as to prevent direct contact between the solid polyelectrolyte film and at least one of the first and second gas diffusion layers, and which inhibits generation of radicals between the solid polyelectrolyte film and at least one of the first and second gas diffusion layers;
wherein at least one of the deterioration inhibitors decomposes hydrogen peroxide into water and oxygen.

2. A solid polyelectrolyte fuel cell comprising:
a solid polyelectrolyte film electrode conjugate in which electrode films are provided on one side and the other side of a solid polyelectrolyte film, respectively;
a first gas diffusion layer provided so as to cover the electrode film on one side of the solid polyelectrolyte film electrode conjugate;
a second gas diffusion layer provided so as to cover the electrode film on the other side of the solid polyelectrolyte film electrode conjugate; and
separators provided on the one side and the other side of the solid polyelectrolyte film electrode conjugate, respectively, with the gas diffusion layers interposed therebetween,
wherein at least one of the first and second gas diffusion layers is provided only on the electrode film without coming into contact with the solid polyelectrolyte film of the solid polyelectrolyte film electrode conjugate;
wherein a first deterioration inhibitor is provided between the solid polyelectrolyte film of the solid polyelectrolyte film electrode conjugate and at least one of the first and second gas diffusion layers so as to prevent direct contact between the solid polyelectrolyte film and at least one of the first and second gas diffusion layers, and which inhibits generation of radicals between the solid polyelectrolyte film and at least one of the first and second gas diffusion layers; and
wherein a second deterioration inhibitor is provided in peripheral ends of the solid polyelectrolyte film of the solid polyelectrolyte film electrode conjugate and at least one of the first and second gas diffusion layers so as to prevent direct contact between the solid polyelectrolyte film and at least one of the first and second gas diffusion layers, and which inhibits generation of radicals between the solid polyelectrolyte film and at least one of the first and second gas diffusion layers;
wherein at least one of the deterioration inhibitors decomposes hydrogen peroxide into water and oxygen.

* * * * *